2,926,091

SESAME SEED FOOD PRODUCT AND PROCESS OF PRODUCING THE SAME

Thomas F. Riddle, Freeport, N.Y.

No Drawing. Application August 4, 1958
Serial No. 753,074

10 Claims. (Cl. 99—140)

This invention relates generally to food products, and has particular reference to an improved substance composed essentially of sesame seeds.

It is a general object of the invention to provide a new and inexpensive edible product which has unusual palatability and a wide variety of uses, and which combines in a novel manner the physical characteristics of a mass of sesame seeds, and flavors not usually associated with them.

The invention is predicated upon a recognition that certain physical and chemical qualities naturally present in sesame seeds can be utilized advantageously to make the seeds usable in the food field for many purposes beyond those for which they are commonly employed. More particularly, it has been found that sesame seeds uniquely combine the physical masticatory feel of comminuted particles such as nut meats, and a texture, absorptivity and chemical inertness which adapts them to serve admirably as carriers of extraneous flavors imparted to them. Thus, despite the fact that sesame seeds naturally contain certain oils, nevertheless the mildness of flavor of these oils, and the quantity normally present, permit entirely foreign relatively strong flavoring substances to be successfully incorporated with the seeds. Somehow the natural sesame flavor appears either to become partially eliminated, or to be so subdued or blended with the added material that the flavor and aroma of the latter can be caused to be dominant and to remain so.

The invention consists, in brief, in the incorporation with natural whole sesame seeds, either with or without roasting, of special extraneous flavoring ingredients. These substances may be applied in various ways, depending upon the degree of impregnation or coating desired, and the purpose for which the newly flavored product is to be used. The flavoring extracts or oils may be sprayed onto the sesame seeds, or caused by other means to become coated upon or incorporated with the seeds. The spray may be in the form of a relatively fluent solution or emulsion or suspension, or it may be more viscous and adherent. If the procedure is carried out under less-than-atmospheric conditions, and with the aid of heat, better results are achieved and the spray may be a fine mist or vapor having enhanced penetrative power. Or the seeds may be soaked in or otherwise brought into close physical contact with the flavoring solution or mixture.

An unusually effective way of coating the seeds, especially useful in the confectionery field, is to dissolve or disperse the flavoring extract or base in a sugar solution, and to apply the solution in a condition that is almost at the stage of crystallization. A coating thus produced, especially if it is sprayed onto the seeds, converts the natural seeds to an entirely new and palatable food product.

The flavors to be imparted to the seeds will of course vary, depending upon the results desired. For example, the flavor of walnuts or of almonds or of other nuts having distinctive taste characteristics may be incorporated with the seeds, whereby the resultant product is useful in the baking and confectionery industries as a substitute for more expensive natural nut meats in the manufacture of baked goods and candies. The specially flavored seeds may also be used as a cereal or health food, or as a substance to be sprinkled on foods or as an ingredient of ice cream, cheese, and other food products. Flavors such as nutmeg, cardamon, spices, as well as fruit flavors, may also be used.

The flavor to be added to the seeds may stem from natural or synthetic oils or other aromatic chemicals. The amount used in any case will depend on the strength and distinctiveness of the flavor, and the nature and purpose of the flavored sesame seed product. Similarly, the vehicle to be employed for the flavor will depend upon the nature of the procedure to be employed in bringing the flavor into contact with the seeds.

The practice of the invention under heat and vacuum conditions is preferred, since the evacuation of air and other volatile substances from the natural sesame seeds has a preservative effect, and also facilitates the penetration of the new flavoring substance.

The following examples indicate various ways of carrying out the objectives of the invention.

*Example 1*

One-tenth of a pound of flavoring oil is dissolved in two pounds of 95% alcohol. This solution is then sprayed onto 100 pounds of whole sesame seeds. Either before, during, or after the spraying operation the seeds are roasted in a rotary oven for about 20 minutes at a temperature of about 375° F.

*Example 2*

The sesame seeds (100 pounds) are first roasted in a rotary oven for about 20 minutes at a temperature of about 375° F. They are then placed in a rotary vacuum drier and the air evacuated. One half pound of flavoring oil at a temperature close to its boiling point is then injected into the drier in the form of a spray. The drier is then rotated for 20 to 30 minutes, while the temperature is maintained in the approximate range of 158° to 176° F.

*Example 3*

A relatively fluent emulsion is formed of 200 pounds of water, ¼ pound of gum acacia, and ½ pound of flavoring oil. The emulsion is then placed into a rotary vacuum drier along with 100 pounds of sesame seeds. The mixture is dried under vacuum and heat, and thereafter the flavored seeds may be roasted in any usual manner.

*Example 4*

An emulsion is formed of 8 pounds of water, ¼ pound of gum acacia, and ½ pound of flavoring oil. This emulsion is then sprayed onto 100 pounds of whole sesame seeds at room temperature and pressure. The seeds are subjected to any usual roasting procedure either before or after the spraying operation.

*Example 5*

To 5 gallons of an aqueous sugar solution, ½ pound of flavoring oil is added, and the mixture is thoroughly and rapidly agitated. Either before or after a roasting of 100 pounds of sesame seeds in any usual way the sugary mixture is sprayed onto them at room temperature and pressure. Preferably, the sugar is at a stage just about ready to crystallize.

In each case, the resultant sesame seed product combines, in a highly useful way, the characteristic flavor desired and the physical qualities of a mass of small edible particles. The wide variety of uses for such a product have already been indicated.

The term "impregnated" as used in the appended claims is intended to designate the intimate incorporation of the flavoring substance with the seeds, regardless of the manner in which it is introduced or applied to the seeds.

In general it will be understood that the details and formulations herein set forth may be modified in many ways without necessarily departing from the spirit of the invention and the scope of the claims.

What is claimed is:

1. A food product consisting of whole sesame seeds impregnated with an extraneous flavoring substance.

2. A food product consisting of whole sesame seeds devoid of at least some of the volatile substances naturally present therein, and carrying instead an extraneous flavoring substance.

3. A food product usable as a substitute for comminuted nut meats, consisting of whole sesame seeds impregnated with a flavoring substance having the flavor of said nuts.

4. A process of making a food product of the character described, which consists in impregnating whole sesame seeds with a flavoring substance not naturally present therein.

5. A process as set forth in claim 4 in which said flavoring substance is incorporated with the seeds by spraying it onto the seeds.

6. A process as set forth in claim 4 in which said flavoring substance is incorporated with the seeds by soaking the seeds in a liquid containing said substance.

7. A process as set forth in claim 4 in which said flavoring substance is incorporated with the seeds by spraying onto the seeds a liquid containing said substance and crystallizable sugar.

8. A process as set forth in claim 4 in which said flavoring substance is incorporated with the seeds by means of an emulsion consisting of said flavoring substance, water, and an emulsifying agent.

9. A process of making a food product which consists in subjecting whole sesame seeds to heat and vacuum to extract air and volatile substances normally present therein, and then introducing an extraneous flavoring substance into the seeds.

10. A process as set forth in claim 9, said seeds being roasted during the course of said procedure.

References Cited in the file of this patent

UNITED STATES PATENTS

| | | |
|---|---|---|
| 2,035,136 | Levinson et al. | Mar. 24, 1936 |
| 2,246,528 | Musher | June 24, 1941 |
| 2,282,818 | Musher | May 12, 1942 |
| 2,384,532 | Bush et al. | Sept. 11, 1945 |
| 2,650,883 | Van Blaricorn et al. | Sept. 1, 1953 |